COUNTING AND BATCHING DEVICE

Filed July 7, 1947 2 Sheets-Sheet 1

INVENTOR.
JOHN T. POTTER
BY Alfred W. Barber
ATTORNEY

Sept. 26, 1950 J. T. POTTER 2,523,517

COUNTING AND BATCHING DEVICE

Filed July 7, 1947 2 Sheets-Sheet 2

INVENTOR.

JOHN T. POTTER

BY Alfred W. Barber

ATTORNEY

Patented Sept. 26, 1950

2,523,517

UNITED STATES PATENT OFFICE 2,523,517

COUNTING AND BATCHING DEVICE

John T. Potter, New York, N. Y.

Application July 7, 1947, Serial No. 764,802

1 Claim. (Cl. 235—98)

The present invention concerns counting devices and, in particular, electro-mechanical counting devices capable of counting into predetermined groups small objects such as pills and at very high speed.

One object of the present invention is to provide, a method of, and means for counting and grouping small objects such as pills at a very high rate of speed.

Another object is to move small objects from a large group into a single line moving at high speed suitable for counting.

Still another object is to move small objects from a substantially stationary large group to a single line at high speed without, at any point, subjecting the objects to sudden acceleration or other forces which might damage fragile objects.

A still further object is to divide such small objects into accurately counted groups at a very high rate of speed and without damaging even fragile objects.

A further object is to provide means for counting and grouping quickly and accurately extremely small objects such as watch-maker's screws.

Many industries package products in groups such as a dozen, a gross, a hundred, etc. to a package. Large or expensive objects are often counted by hand and some machines deliver their product in convenient groups. However, where large quantities of small inexpensive objects such as pills are to be grouped it is usually done by weighing. This is slow and expensive and is often made more expensive by including an overage of about 3 percent since exact count cannot generally be determined by weighing. Hence there existed a need for a method of and means for counting and grouping small sometimes fragile objects accurately and extremely rapidly.

According to the present invention a quantity of objects to be counted is fed to the center of a revolving turntable where a spiral guide causes them to accelerate gradually and smoothly in a spiral path to the outer rim of the turntable. A flexible belt passing around all but a small portion of the rim of the turntable and running with it, guides the objects at full rim speed to an opening where they leave in a trajectory determined by the turntable speed, weight and size of the objects, etc. At a predetermined point in this trajectory they interrupt a beam of light falling on a photo-electric cell. The photo-electric cell is connected to a predetermined counter of one or more channels of the type set forth in copending patent application of John T. Potter, bearing Serial Number 657,581, entitled "Predetermined Electronic Counters," which was filed on March 27, 1946. Utilizing a single channel predetermined counter the counter is preset to the desired quantity in a group as, for instance, 100 and a control signal or pulse is derived from the output of the counter each time the preset count is reached. This control signal or pulse is used to direct the flow of objects being counted into separate containers, compartments, piles, etc. One convenient manner for filling containers or bottles is to have two chutes directed to two containers or bottles in alternately moving lines. The control signal is utilized to move a gate at extremely high speed to direct the flow first to one chute and then to the other. The containers or bottles are advanced one step during the time that the alternate container or bottle is being filled. This system can operate at extremely high speed filling several containers or bottles per second since it requires moving the bottles only during the filling time while the gate may be made to operate almost instantaneously to change the direction of flow. Since the objects are accelerated gradually by the spiral and turntable and are directed from one container to another by the gate which merely deflects them slightly one way or the other as they fall in an arc no sudden acceleration or impact is applied and relatively fragile objects may be handled without damage.

The above objects as well as others will be apparent from the detailed description of the various figures of the drawing.

Figure 1:
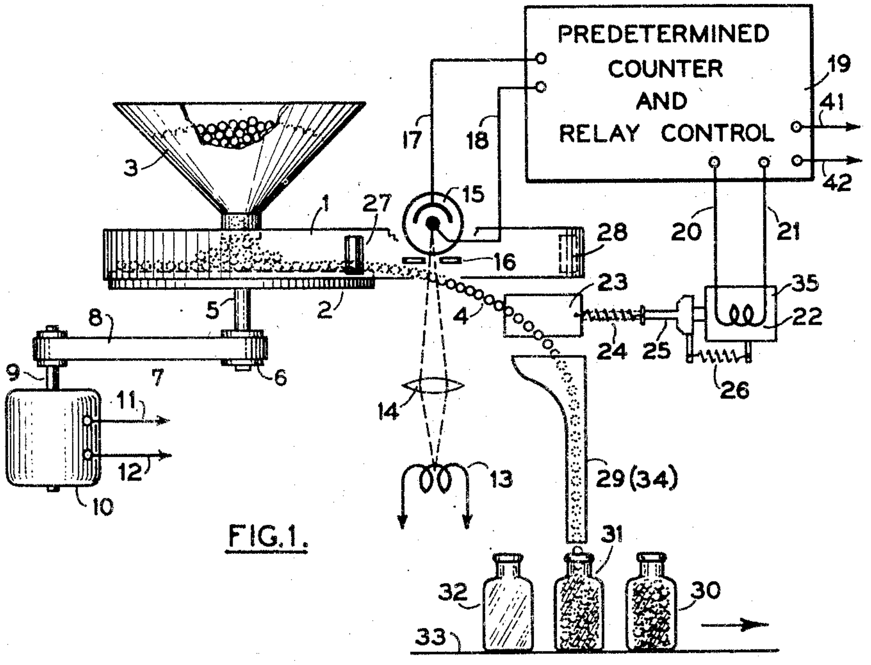
Fig. 1 shows a side view of a preferred form of the present invention.

Fig. 1 shows a pill counter embodying one form of the present invention. A belt 1 passes partially around the rim of a turntable 2 which acts to align and accelerate the pills supplied from hopper 3. The manner in which the pills are aligned and accelerated will be described in more detail below in connection with Fig. 2. Also shown in Fig. 1 is the driving mechanism for turntable 2 consisting of a motor 10 supplied with electrical power over leads 11 and 12. Motor 10 has a shaft 9 and pulley 8. Turntable 2 has a shaft 5 and pulley 6. Turntable 2 is rotated by motor 10 through belt 7 which couples pulleys 6 and 8. Pills are aligned and accelerated by turntable 2 and are emitted single file in a trajection 4. The pills are emitted with sufficient velocity to pass through the air from the point at which they leave turntable 2 until they arrive at the flared end of chutes 29 or 34. Across this path a light from lamp 13 and focussed into a beam by lens 14 shines into photo-electric cell 15 so that as the pills pass they cast a shadow into the photo-electric cell. A mask 16 is provided and its opening may be adjusted in order to obtain the best response from each individual pill passing by. Small pills, for instance, may require a narrower opening in mask 16 than large pills. The impulses generated in photo-electric cell 15 are passed to "predetermined counter" 19 over wires 17 and 18. This counter 19 is capable of generating a control signal each time it receives a predetermined number of impulses from photo-electric cell 15. For instance, it may be set to count 100 and it will generate a control signal each time 100 pills have passed. The output of counter 19 consisting of this control signal is applied by means of leads 20 and 21 to a "gate" control coil 22. As shown in Fig. 1 the pills are passing in front of gate 23 into chute 29 and into bottle 31. When the predetermined number of pills have passed the photo-electric cell a control signal from counter 19 and applied to coil 22 flips the gate over suddenly and causes gate 23 to deflect the stream of pills behind it into the rear chute 34 and into a bottle behind bottle 31 (not shown). While this second bottle is being filled, bottle 31 is moved one step to the right and empty bottle 32 is moved into place below chute 29. When the rear bottle has received the predetermined count of pills another control signal is generated operating a second gate control (not shown) flipping gate 23 back to its initial position and thereby deflecting pills into chute 29 again. This process is repeated at a high rate of speed.

Figure 2:
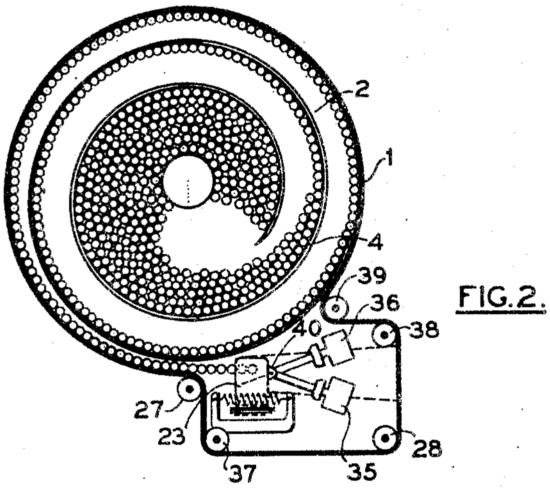
Fig. 2 shows a top view of a portion of the form of the invention shown in Fig. 1.

Fig. 2 shows a top view of the turntable 2, belt 1 and the gate controls. Gate relay 35 pulls gate 23 into one deflecting position when one control pulse is received while relay 36 pulls gate 23 back to its original position at the next control pulse so that the pills are deflected first into one chute and then into the other. The predetermined counter 19 of Fig. 1 may be preset to count alternately to two different numbers in accordance with the disclosure of the above designated patent application. In this way two control signals may be generated alternately one to control relay 35 over wires 20 and 21 of Fig. 1 and the other to control relay 36 over wires 41 and 42 in order to direct one quantity of pills into the bottles in one row and another quantity into the bottles in the other row.

Fig. 2 also shows one manner in which the belt 1 may pass around or under rollers 27, 37, 28, 38 and 39 to provide a clear space for the relays and other associated parts.

In operation pills (or other parts to be grouped) are fed to the center of turntable 2. As belt 1 rotates with turntable 2 the pills are gently accelerated and finally appear in single file against belt 1. As they leave belt 1, they pass across the light beam to gate 23 and are there deflected to the desired bottle. At the end of each count the appropriate relay actuates the gate and starts the alternate count. Evidently equal numbers may be counted by setting both predetermining switches to the same number.

Figure 3:
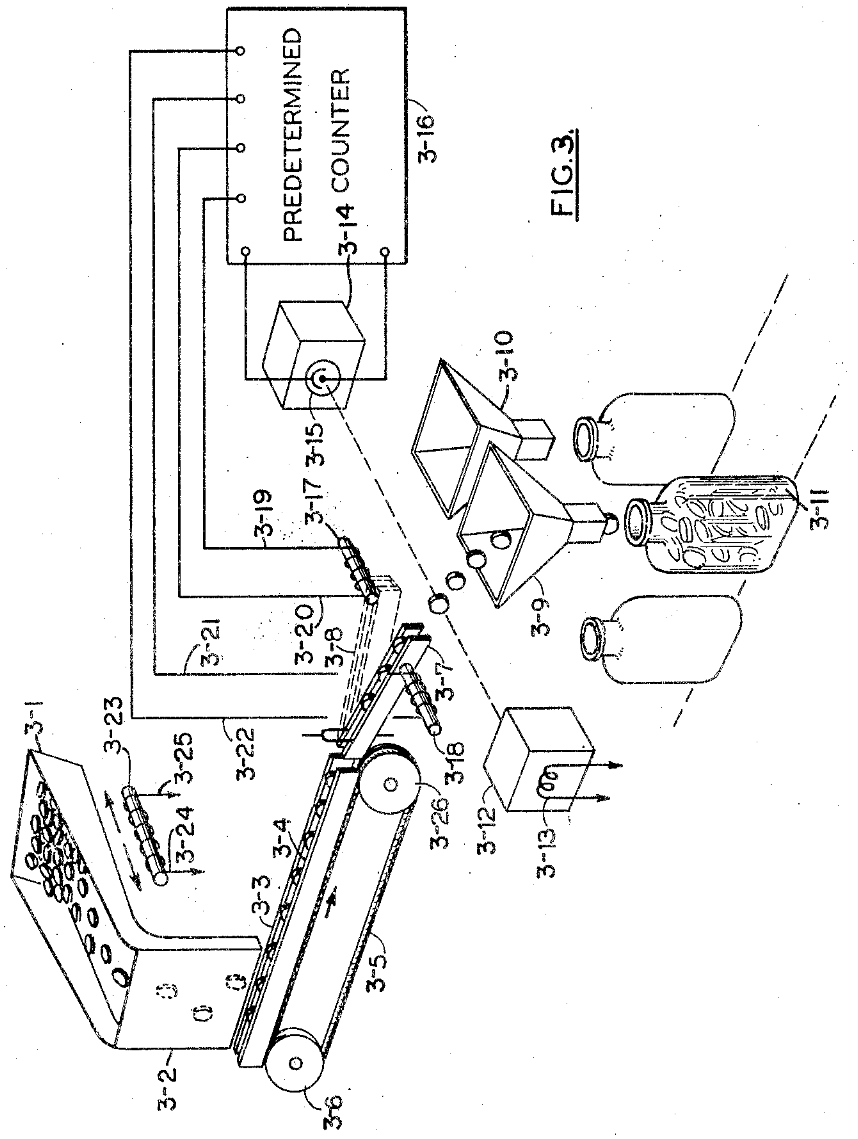
Fig. 3 shows details on a modified form of gate utilized in the present invention.

Fig. 3 shows a modified form of sorting device according to the present invention. In Fig. 3 a hopper 3—1 for holding the pills to be counted has a neck 3—2 for feeding the pills one at a time to moving belt 3—5. In order to cause the pills to drop out of neck 3—2 in a regulate manner the hopper 3—1 may be vibrated in any convenient manner as by means of solenoid 3—23 supplied with alternating current over leads 3—24 and 3—25. Belt 3—5 moved in the direction indicated by the arrow by suitable driving means (not shown) connected to one of the pulleys 3—6 and 3—26 moves the pills (or other objects to be counted) along a channel formed by guides 3—3 and 3—4 to chute 3—7. This chute 3—7 is a gate which directs the pills either to funnel 3—9 or to funnel 3—10 depending on its position. Magnet 3—18 connected by means of leads 3—21 and 3—22 to a source of control current such as Predetermined Counter 3—16 serves to pull chute 3—7 into the position shown to deposit pills in funnel 3—10 and through it into bottle 3—11. Magnet 3—17 connected by means of leads 3—19 and 3—20 to the source of control current 3—16 serves to pull the chute into dotted position at 3—8 for depositing the pills in funnel 3—10 and through it into another bottle (or container). As the pills emerge from chute 3—7 they pass a beam of light from lamps 3—13 in box 3—12 directed upon photoelectric cell 3—15 in box 3—14. As they pass this beam of light they interrupt it causing a pulse in photoelectric cell 3—15 which is passed to counter 3—16 and there counted. Counter 3—16 is preset to one or two predetermined counts. If a single count is utilized magnet 3—17 is energized alternately with magnet 3—18 so that chute 3—7 passes the required number of pills alternately to funnels 3—9 and 3—10 and hence to the bottles or containers being filled. Two counts may be utilized, for instance, allowing one quantity of pills to pass to funnel 3—9 upon the completion of which magnet 3—17 is energized and a second quantity passed to funnel 3—10. Upon the completion of the second count magnet 3—18 is energized returning chute 3—7 to its first position after which the cycle of operation is repeated.

It will be seen that the pills (or other objects) being counted and sorted are supplied in a steady flow and that the gating by chute 3—7 controlled by counter 3—16 determines how many are deposited in a given bottle. No stopping or starting of the objects is required hence very high speed sorting of even fragile objects is possible. The counting is positive as contrasted with weighing operations and hence the sorting is of absolute accuracy.

The predetermined counter as disclosed in the above designated application may include a relay control circuit in its output for closing a circuit to energize some external device upon the completion of the count.

While only two forms of the present invention have been shown and described many modifications will be apparent to those skilled in the art and within the spirit and scope of the invention as set forth in the appended claim.

What is claimed is:

In a device of the class described, the combination of, a hopper for receiving a large number of small objects to be grouped, means for vibrating said hopper to cause said objects to leave said hopper at a gradual rate, a moving belt for receiving and accelerating said objects after leaving said hopper, guiding means along said belt for confining said objects to single file passage, a movable extension for said guiding means to direct said objects to predetermined receiving means the end of said directing means being spaced from said receiving means, means for counting said objects as they pass through said space, and control means actuated by said counting means for moving said directing means alternately between two predetermined positions at predetermined counts for alternately directing said objects in predetermined groups to said receiving means.

JOHN T. POTTER.

REFERENCES CITED

The following references are of record in the file of this patent:

UNITED STATES PATENTS

| Number | Name | Date |
|---|---|---|
| 2,045,769 | Geffcken et al. | June 30, 1936 |
| 2,059,398 | Roemer | Nov. 3, 1936 |
| 2,144,708 | Rau | Jan. 24, 1939 |
| 2,304,982 | Wilckens | Dec. 15, 1942 |
| 2,326,675 | Pearson et al. | Apr. 10, 1943 |
| 2,333,791 | Hutchison, Jr. | Nov. 9, 1943 |
| 2,348,141 | Luhn | May 2, 1944 |
| 2,417,074 | Green | Mar. 11, 1947 |
| 2,470,926 | Gieseke | May 24, 1949 |